United States Patent
Seo

(10) Patent No.: US 11,341,253 B2
(45) Date of Patent: May 24, 2022

(54) TERMINAL APPARATUS AND CONTROL METHOD OF TERMINAL APPARATUS

(71) Applicant: Samsung Electronics Co., Ltd., Suwon-si (KR)

(72) Inventor: Jaewoo Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 61 days.

(21) Appl. No.: 16/760,653

(22) PCT Filed: Nov. 22, 2018

(86) PCT No.: PCT/KR2018/014392
§ 371 (c)(1),
(2) Date: Apr. 30, 2020

(87) PCT Pub. No.: WO2019/124770
PCT Pub. Date: Jun. 27, 2019

(65) Prior Publication Data
US 2020/0349262 A1   Nov. 5, 2020

(30) Foreign Application Priority Data

Dec. 21, 2017 (KR) .................. 10-2017-0177237

(51) Int. Cl.
*G06F 21/60* (2013.01)
*G06F 21/62* (2013.01)
*G06N 3/08* (2006.01)

(52) U.S. Cl.
CPC ........ *G06F 21/602* (2013.01); *G06F 21/6218* (2013.01); *G06N 3/08* (2013.01)

(58) Field of Classification Search
CPC .............. G06F 21/602; G06F 21/6218; G06F 21/6245; G06N 3/08; G06N 20/00
See application file for complete search history.

(56) References Cited

U.S. PATENT DOCUMENTS 7,072,876 B1 * 7/2006 Michael ................ G06F 21/552
706/45
8,619,933 B2    12/2013 Aoyagi
(Continued)

FOREIGN PATENT DOCUMENTS

KR   10-2015-0110653 A   10/2015
KR   10-2016-0008509 A    1/2016
(Continued)

OTHER PUBLICATIONS

Seny Kamara, Encrypted Search, Microsoft Research.

*Primary Examiner* — Meng Li
(74) *Attorney, Agent, or Firm* — Jefferson IP Law, LLP

(57) ABSTRACT

A control method of a terminal apparatus is disclosed. A control method of a terminal apparatus comprises the steps of: determining the number of different ciphertexts, into which behavior data generated according to operation of the terminal apparatus by a user is to be encrypted, for each data type of the behavior data; generating ciphertexts by encrypting behavior data of an identical type in a unit of the determined number of the different ciphertexts so that the behavior data can be encrypted into different ciphertexts; transmitting the generated ciphertexts to an external server; when a model of the behavior data having been used to acquire learning on the basis of the transmitted ciphertexts is received, monitoring an operation of the terminal apparatus on the basis of the received model. Here, the model may be obtained through acquisition of learning according to at least one of a machine learning algorithm, a neural network algorithm, and a deep learning algorithm.

13 Claims, 6 Drawing Sheets

(56) References Cited

U.S. PATENT DOCUMENTS

| | | | |
|---|---|---|---|
| 9,160,742 B1 | 10/2015 | Ackerman et al. | |
| 9,613,196 B2 | 4/2017 | Kohlenberg et al. | |
| 9,996,694 B2 | 6/2018 | Sethumadhavan et al. | |
| 2006/0101413 A1* | 5/2006 | Kinno | G06F 11/0751 |
| | | | 717/127 |
| 2007/0297606 A1* | 12/2007 | Tkacik | G06F 21/6218 |
| | | | 380/239 |
| 2017/0041413 A1 | 2/2017 | Chandhok et al. | |
| 2017/0078088 A1* | 3/2017 | Shanmugam | H04W 12/03 |
| 2017/0103227 A1 | 4/2017 | Kerschbaum et al. | |
| 2017/0193225 A1 | 7/2017 | Moon et al. | |
| 2017/0264749 A1 | 9/2017 | Wu et al. | |
| 2018/0109538 A1* | 4/2018 | Kumar | H04L 63/08 |
| 2018/0191759 A1* | 7/2018 | Baijal | H04L 63/1425 |
| 2019/0147170 A1* | 5/2019 | Keselman | G06F 16/278 |
| | | | 713/189 |

FOREIGN PATENT DOCUMENTS

| | | |
|---|---|---|
| KR | 10-2017-0056045 A | 5/2017 |
| KR | 10-2017-0081386 A | 7/2017 |
| WO | 2014/116977 A2 | 7/2014 |

\* cited by examiner (a)

| SYSTEM CALL | CIPHERTEXT |
|---|---|
| read | a |
| write | b |
| open | c |

(b)

| SYSTEM CALL | CIPHERTEXT |
|---|---|
| read | a |
| | b |
| | c |
| | d |
| | e |
| write | j |
| | k |
| open | x |
| | y |
| | z |

(c)

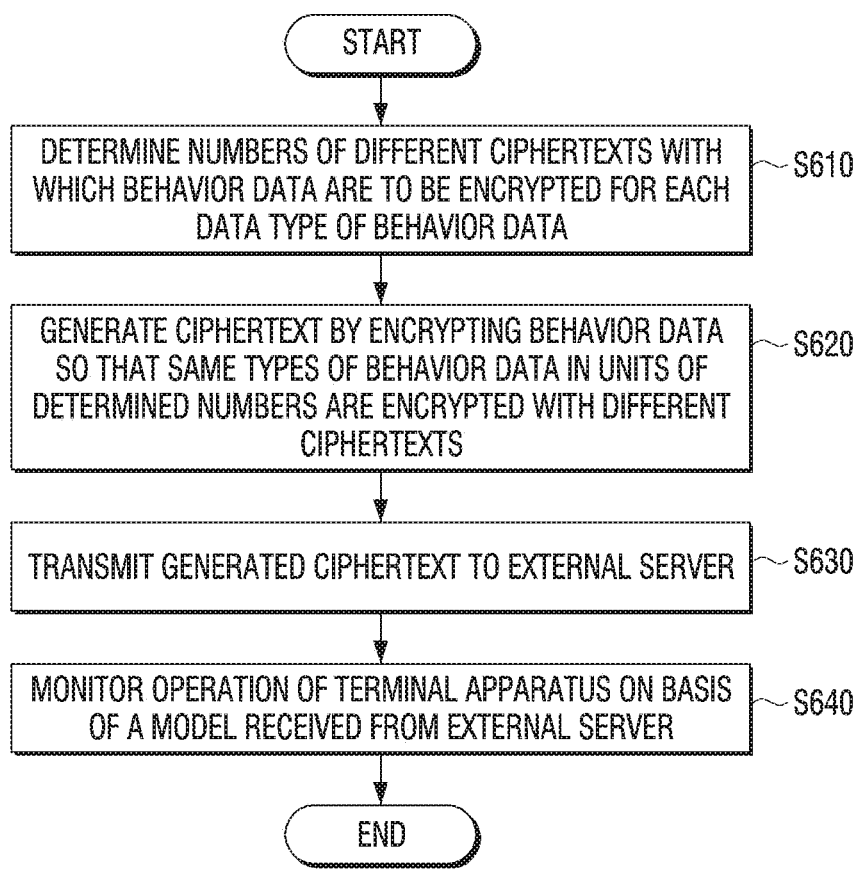

TERMINAL APPARATUS AND CONTROL METHOD OF TERMINAL APPARATUS

TECHNICAL FIELD

The disclosure relates to a terminal apparatus and a control method of a terminal apparatus, and more particularly, to a terminal apparatus configuring a machine learning system and a control method of a terminal apparatus.

BACKGROUND ART

An attempt to apply a machine learning technology recently developed rapidly centered around deep learning to various fields such as autonomous driving, advertisement, education, finance, healthcare, e-commerce, national defense, security, and the like, due to versatility of the machine learning technology has been conducted. Therefore, the emergence of various intelligent systems has been predicted.

Machine learning is one field of an artificial intelligence technology, and is a modeling scheme of generating a model using data. Machine learning-based modeling requires a large amount of data collected for a predetermined time or more and a high computation amount, and learning is thus generally performed through a server rather than a terminal apparatus.

In particular, in a system generating and utilizing a machine learning-based model using data collected by a terminal apparatus, a machine learning server generates a model using the data collected from the terminal apparatus. In this case, a privacy problem of a user of the terminal apparatus may occur.

For example, in a case of a machine learning-based system detecting abnormal behavior of the user by learning system calls of an operating system of the terminal apparatus, the server learns system call data received from the terminal apparatus to generate a normal pattern model of user behavior and transmits the generated normal pattern model to the terminal apparatus. Therefore, the terminal apparatus may compare the normal pattern model received from the server with system calls generated according to a manipulation of the terminal apparatus by the user to detect the abnormal behavior of the user.

In such a system, the server may analyze the system call data at any time to know what the user is doing through the terminal apparatus, and the privacy problem of the user of the terminal apparatus may thus occur.

To prevent such a privacy problem, a method of encrypting the system call data may be considered. However, in a case of encrypting the system calls through a probabilistic encryption scheme, the same system calls are encrypted with different ciphertexts, such that there is a problem that the machine learning is impossible. In addition, in a case of encrypting the system calls through a deterministic encryption scheme, the machining learning is possible, but there is still a problem that the encryption of the system calls through the deterministic encryption scheme is vulnerable to a frequency attack based on statistical data on the system calls.

Therefore, in a system generating and utilizing a machine learning-based model using of behavior data of the user collected through the terminal apparatus, there is a need for a technology capable of learning the behavior data in the server and utilizing the behavior data in the terminal apparatus without causing the privacy problem of the user.

DISCLOSURE

Technical Problem

The disclosure provides a terminal apparatus and a control method of a terminal apparatus, which can learn behavior data of a user of the terminal apparatus in a server without causing a privacy problem and utilize a learned model in the terminal apparatus.

Technical Solution

According to an embodiment of the disclosure, a control method of a terminal apparatus includes: determining the numbers of different ciphertexts with which behavior data generated in accordance with a manipulation of the terminal apparatus by a user are to be encrypted for each data type of the behavior data; generating a ciphertext by encrypting the behavior data so that the same types of behavior data in units of the determined numbers are encrypted with different ciphertexts; transmitting the generated ciphertext to an external server; and monitoring an operation of the terminal apparatus on the basis of a model on the behavior data learned on the basis of the transmitted ciphertext when the model is received.

The determining may include: obtaining statistical data on occurrence frequencies for each data type of the behavior data; and determining that the numbers of ciphertexts for each data type making occurrence frequencies of each ciphertext predetermined frequencies are the numbers of different ciphertexts in a case where each of the types of the behavior data on the obtained statistical data is encrypted with at least one ciphertext.

The predetermined frequencies may be different from the occurrence frequencies for each data type of the behavior data on the statistical data.

The monitoring may include: generating a ciphertext by encrypting behavior data generated after the reception of the model so that the same types of behavior data in units of the determined numbers are encrypted with the different ciphertexts, and monitoring the operation of the terminal apparatus by comparing the ciphertext generated after the reception of the model with the model.

In the generating, the generated behavior data may be sequentially encrypted using a deterministic encryption scheme.

The behavior data may be learning data that the external server uses for machine learning to generate the model.

The behavior data may be invoking data of system call functions provided by an operating system of the terminal apparatus or data on operations performed by the terminal apparatus, and the model may be a model regarding a pattern of system calls invoked when the terminal apparatus operates or a model regarding an operation pattern of the terminal apparatus.

The control method may further include updating the model at a predetermined period.

According to another embodiment of the disclosure, a terminal apparatus includes: a communicator configured to communicate with an external server; and a processor configured to determine the numbers of different ciphertexts with which behavior data generated in accordance with a manipulation of the terminal apparatus by a user are to be encrypted for each data type of the behavior data, generate a ciphertext by encrypting the behavior data so that the same types of behavior data in units of the determined numbers are encrypted with different ciphertexts, transmit the generated ciphertext to the external server, and monitor an operation of the terminal apparatus on the basis of a model on the behavior data learned on the basis of the transmitted ciphertext when the model is received.

The processor may be configured to obtain statistical data on occurrence frequencies for each data type of the behavior data, and determine that the numbers of ciphertexts for each data type making occurrence frequencies of each ciphertext predetermined frequencies are the numbers of different ciphertexts in a case where each of the types of the behavior data on the obtained statistical data is encrypted with at least one ciphertext.

The predetermined frequencies may be different from the occurrence frequencies for each data type of the behavior data on the statistical data.

The processor may be configured to generate a ciphertext by encrypting behavior data generated after the reception of the model so that the same types of behavior data in units of the determined numbers are encrypted with the different ciphertexts, and monitor the operation of the terminal apparatus by comparing the ciphertext generated after the reception of the model with the model.

The processor may be configured to sequentially encrypt the generated behavior data using a deterministic encryption scheme.

The behavior data may be learning data that the external server uses for machine learning to generate the model.

The behavior data may be invoking data of system call functions provided by an operating system of the terminal apparatus or data on operations performed by the terminal apparatus, and the model may be a model regarding a pattern of system calls invoked when the terminal apparatus operates or a model regarding an operation pattern of the terminal apparatus.

The processor may be configured to update the model at a predetermined period.

According to still another embodiment of the disclosure, a computer-readable recording medium includes a program for executing a control method of a terminal apparatus, wherein the control method includes: determining the numbers of different ciphertexts with which behavior data generated in accordance with a manipulation of the terminal apparatus by a user are to be encrypted for each data type of the behavior data; generating a ciphertext by encrypting the behavior data so that the same types of behavior data in units of the determined numbers are encrypted with different ciphertexts; transmitting the generated ciphertext to an external server; and monitoring an operation of the terminal apparatus on the basis of a model on the behavior data learned on the basis of the transmitted ciphertext when the model is received.

Advantageous Effects

As described above, according to the diverse embodiment of the disclosure, it is possible to learn the behavior data of the user of the terminal apparatus in the server and utilize the learned model in the terminal apparatus, without causing the privacy problem.

DESCRIPTION OF DRAWINGS

FIG. 6 is a flow chart illustrating operations of the terminal apparatus according to an embodiment of the disclosure.

BEST MODE

Figure 1:
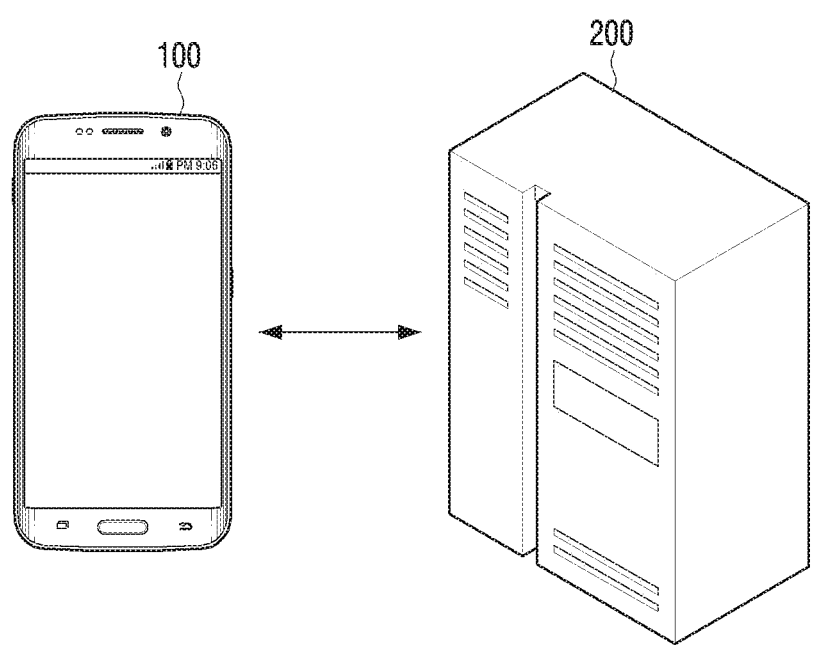
FIG. 1 is a view illustrating a machine learning system according to an embodiment of the disclosure.

Hereinafter, diverse embodiments of the disclosure will be described with reference to the accompanying drawings. However, it is to be understood that technologies mentioned in the disclosure are not limited to specific embodiments, but include all modifications, equivalents, and/or alternatives according to embodiments of the disclosure. Throughout the accompanying drawings, similar components will be denoted by similar reference numerals.

In the disclosure, an expression "have", "may have", "include", or "may include" indicates existence of a corresponding feature (for example, a numerical value, a function, an operation, or a component such as a part), and does not exclude existence of an additional feature.

In the disclosure, an expression "A or B", "at least one of A and/or B", or "one or more of A and/or B", may include all possible combinations of items enumerated together. For example, "A or B", "at least one of A and B", or "at least one of A or B" may indicate all of 1) a case where at least one A is included, 2) a case where at least one B is included, or 3) a case where both of at least one A and at least one B are included.

Expressions "first" or "second" used in the disclosure may indicate various components regardless of a sequence and/or importance of the components, will be used only to distinguish one component from the other components, and do not limit the corresponding components.

When it is mentioned that any component (for example, a first component) is (operatively or communicatively) coupled to or is connected to another component (for example, a second component), it is to be understood that any component is directly coupled to another component or may be coupled to another component through the other component (for example, a third component). On the other hand, when it is mentioned that any component (for example, a first component) is "directly coupled" or "directly connected" to another component (for example, a second component), it is to be understood that the other component (for example, a third component) is not present between any component and another component.

An expression "configured (or set) to" used in the disclosure may be replaced by an expression "suitable for", "having the capacity to" "designed to", "adapted to", "made to", or "capable of" depending on a situation. A term "configured (or set) to" may not necessarily mean "specifically designed to" in hardware. Instead, in some situations, an expression "apparatus configured to" may mean that the apparatus may "do" together with other apparatuses or components. For example, a phrase "processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory apparatus.

Hereinafter, diverse embodiments of the disclosure will be described in detail with reference to the accompanying drawings.

FIG. 1 is a view illustrating a machine learning system according to an embodiment of the disclosure. As illustrated in FIG. 1, a machine learning system 10 includes a terminal apparatus 100 and a server 200.

A smartphone has been illustrated as an example of the terminal apparatus 10 in FIG. 1, but an implementation of the terminal apparatus 100 is not limited thereto, and the terminal apparatus 100 may be implemented by various electronic apparatuses such as a smart television (TV), a tablet personal computer (PC), a laptop computer, an electronic picture frame, a large format display (LFD), a table-type display, a personal digital assistants (PDA), an electronic notebook, a smart refrigerator, a washing machine, a cleaner, a sound bar, a door lock, a heater, a router, a microwave oven, and the like. In addition, one server 200 has been illustrated in FIG. 1, but a plurality of servers may perform operations of a server 200 to be described later.

The terminal apparatus 100 may transmit behavior data of a user to the server 200. Here, the behavior data of the user, which is data generated by the terminal apparatus 100 in accordance with a manipulation of the terminal apparatus 100 by the user, is data related to behavior of the user through the terminal apparatus 100.

For example, the behavior data may include data on system calls invoked by an operating system of the terminal apparatus 100 in accordance with the manipulation of the terminal apparatus 100 by the user, data on operations performed by the terminal apparatus 100, generated in accordance with the manipulation of the terminal apparatus 100 by the user, or the like, but is not limited thereto.

Meanwhile, the manipulation of the user generating the behavior data may include all types of manipulations that the user may perform through the terminal apparatus 100, such as a power-on/off manipulation, an application installation, execution, use, or end manipulation, a screen turning manipulation, a web page search manipulation, a camera image-capturing manipulation, a text input manipulation, and the like, of the terminal apparatus 100. Meanwhile, a manipulation that the user may perform may vary according to a type of the terminal apparatus 100.

The terminal apparatus 100 may transmit the behavior data to the server 200 whenever the behavior data is generated or may transmit the behavior data to the server 200 in a predetermined time unit or an operation unit according to the manipulation of the user.

For example, in a case where the behavior data is the data on the system calls, the terminal apparatus 100 may transmit data on invoked system calls to the server 200 whenever the system calls are invoked according to the manipulation of the user or may collect data on the invoked system calls and transmit the collected data to the server 200, in a predetermined time unit or an operation unit according to the manipulation of the user. In addition, in a case where the behavior data is the data on the operations performed by the terminal apparatus 100, the terminal apparatus 100 may transmit generated data on the operations of the terminal apparatus 100 to the server 200 whenever the data on the operations of the terminal apparatus 100 is generated or may transmit data on an operation history of the terminal apparatus 100 to the server 200 in a predetermined time unit.

The server 200 may machine-learn the behavior data received from the terminal apparatus 100 to generate a model. Here, the model is a result generated by the server 200 learning the behavior data as learning data, and the generated model may vary depending on which data the server 200 learns in which time unit.

For example, in a case where the server 200 learns the system calls invoked by the terminal apparatus 100, the server 200 may generate a model regarding a pattern of the system calls invoked when the terminal apparatus 100 operates. In addition, in a case where the server 200 learns the data on the operations performed by the terminal apparatus 100, the server 200 may generate a model regarding an operation pattern of the terminal apparatus 100.

In this case, the system calls or the data on the operations performed by the terminal apparatus 100 are sequentially invoked or generated according to the operation of the terminal apparatus 100, and the server 200 may thus learn the behavior data sequentially invoked or generated as described above in a predetermined time (for example, one day, three hours, or the like) unit to generate a model for each behavior data.

In addition, the server 200 may learn the behavior data received from the terminal apparatus 100 to update the model, and provide the updated model to the terminal apparatus 100. In this case, an update period of the model may be set by a designer of the machine learning system 10 or the user of the terminal apparatus 100.

A content in which the server 200 learns the behavior data to generate or update the model is unrelated to the gist of the disclosure, and a detailed description thereof will thus be omitted.

The server 200 transmits the generated model to the terminal apparatus 100, and the terminal apparatus 100 may perform various operations according to the model received from the server 200.

For example, in a case where the terminal apparatus 100 receives the model regarding the pattern of the system calls, the terminal apparatus 100 may detect or monitor an abnormal manipulation of the user or an abnormal operation of the terminal apparatus 100 by comparing system calls currently invoked according to the operation of the terminal apparatus 100 with the model received from the server 200.

In addition, in a case where the terminal apparatus 100 receives the model regarding the operation pattern of the terminal apparatus 100, the terminal apparatus 100 may detect or monitor an abnormal manipulation of the user or an abnormal operation of the terminal apparatus 100 by comparing data on an operation currently performed by the terminal apparatus 100 (or a current manipulation history of the terminal apparatus 100 by the user) with the model received from the server 200.

Meanwhile, the operation that the terminal apparatus 100 may perform on the basis of the model received from the server 200 is not limited to the monitoring of the abnormal manipulation of the user or the abnormal operation of the terminal apparatus 100, and the operation of the terminal apparatus 100 may vary according to which behavior data the server 200 has learned, such that which model the terminal apparatus 100 has received.

In a series of operation processes of the machine learning system 10 as described above, the terminal apparatus 100 transmits the behavior data to the server 200, and the server 200 receives the behavior data from the terminal apparatus 100. Because the behavior data includes information on the behavior of the user through the terminal apparatus 100, when the terminal apparatus 100 transmits the behavior data to the server 200 without encrypting the behavior data, the behavior data may be leaked in a process of transmitting the behavior data or on the server 200, such that privacy of the user of the terminal apparatus 100 may be invaded. For example, an operator of the server 200 may analyze the behavior data at any time, if necessary, to know what the user of the terminal apparatus 100 is doing.

In a case where the terminal apparatus 100 encrypts the behavior data simply through a probabilistic encryption scheme and transmits the encrypted behavior data to the server 200 to solve such a privacy problem, the server 200 may not learn the behavior data or may not generate a meaningful model even though the server 200 learns the behavior data. In addition, in a case where the terminal apparatus 100 encrypts the behavior data through a deterministic encryption scheme of encrypting the same behavior data with the same ciphertexts and transmits the encrypted behavior data to the server 200, the server 200 may generate a meaningful model by learning the ciphertext, but a frequency attack on the ciphertext is still possible, such that a privacy problem of the user of the terminal apparatus 100 remains.

For example, system calls may be invoked in the order of read-read-write-open-read-open-write-open-read-read while the terminal apparatus 100 operates according to the manipulation of the user, and be transmitted to the server 200. In this case, when the terminal apparatus 100 encrypts the above system calls in the probabilistic encryption scheme, the same system calls are encrypted with different ciphertexts. Therefore, the server 200 may not learn the system calls or generates a meaningless model even though the server 200 learns the system calls.

On the other hand, when the terminal apparatus 100 encrypts the above system calls in the deterministic encryption scheme, the same system calls are encrypted with the same ciphertexts. Therefore, the server 200 may generate a meaningful model by learning the system calls. For example, in a case where read is encrypted with 232#$, write is encrypted with 235*, and open is encrypted with a,&/, the above system calls are encrypted like 232#$-232#$-235*-a,&/-232#$-a,&/-235*-a,&/-232#$-232#$ and are transmitted to the server 200, and the server 200 may generate a model regarding a pattern of the system calls by learning the ciphertexts received from the terminal apparatus 100. That is, the server 200 may not know that 232#$ is read, 235* is write, and a,&/ is open, but may learn a pattern of the ciphertexts to generate a meaningful model.

Meanwhile, even though the terminal apparatus 100 encrypts the system calls as described above in the deterministic encryption scheme, when the server 200 may know which system call has been encrypted with which ciphertext, a privacy leakage problem of the user through the server 200 may still occur.

Specifically, the server 200 may know which system call has been encrypted with which ciphertext using statistical data on occurrence frequencies for each type of system calls invoked when the user uses the terminal apparatus 100. Because machine learning basically generates a model by learning a large amount of data, the ciphertexts received from the terminal apparatus 100 are continuously accumulated in the server 200. Because encrypting the system calls simply in the deterministic encryption scheme is to encrypt the same types of system calls with the same ciphertexts, and frequencies for each type of the continuously accumulated ciphertexts follow the statistical data. Therefore, the server 200 may know which system call has been encrypted with which ciphertext by comparing the frequencies for each type of the accumulated ciphertexts with the frequencies for each type of the system calls on the statistical data.

In the above example, when frequencies of ciphertexts 232#$:235*:a,&/ accumulated in the server 200 are 5:2:3, and frequencies of read:write:open on the statistical data is 5:2:3, the server 200 may know that read is encrypted with 232#$, write is encrypted with 235*, and open is encrypted with a,&/. As such, it is called a frequency attack to reversely find out which data has been encrypted with which ciphertext using general statistical data on frequencies for each type of data.

That is, even though the terminal apparatus 100 encrypts the behavior data through the deterministic encryption scheme, the server 200 may perform the frequency attack using the statistical data. Therefore, the behavior data of the user of the terminal apparatus 100 is not still safe.

However, according to an embodiment of the disclosure, in the series of operation processes of the machine learning system 10 as described above, the terminal apparatus 100 encrypts the behavior data with different numbers of ciphertexts for each type of the behavior data, and applies the deterministic encryption scheme in this case, such that the server 200 may learn the behavior data without causing a privacy problem (hacking, a frequency attack, or the like) of the user.

Figure 2:
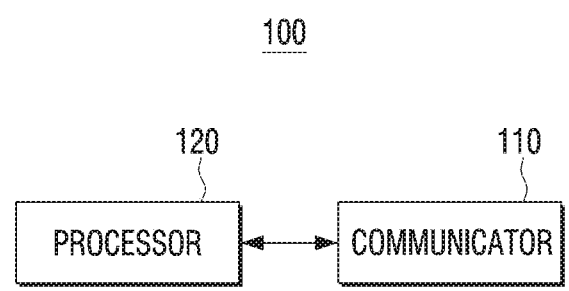
FIG. 2 is a block diagram of a terminal apparatus according to an embodiment of the disclosure.

FIG. 2 is a configuration diagram of the terminal apparatus 100 according to an embodiment of the disclosure. As illustrated in FIG. 2, the terminal apparatus 100 includes a communicator 110 and a processor 120.

The communicator 110 may perform communication with various types of external machines in various wired or wireless schemes. In particular, the communicator 110 may communicate with the server 200 under the control of the processor 120. In this case, the server 200 may be a machine learning server receiving and learning the behavior data from the terminal apparatus 100 and generating the model.

Meanwhile, the communicator 110 may communicate with a separate server providing statistical data on occurrence frequencies for each data type of the behavior data. However, according to an embodiment, the server 200 may provide the statistical data to the terminal apparatus 100.

The processor 120 controls a general operation of the terminal apparatus 100. In particular, the processor 120 may generate the behavior data in accordance with the manipulation of the terminal apparatus 100 by the user.

For example, the processor 120 may generate data on system call functions invoked in accordance with the manipulation of the terminal apparatus 100 by the user. Specifically, whenever the terminal apparatus 100 equipped with an operating system operates according to the manipulation of the user, system call functions supported by the operating system are invoked, and the processor 120 may generate data on the system call functions invoked whenever the terminal apparatus 100 operates as described above.

Here, the generation of the data on the system call functions by the processor 120 may be separate generation of the data on the invoked system call functions by the processor 120. Alternatively, the invoking itself of the system call functions by the processor 120 according to the operation of the terminal apparatus 100 may also be included in the generation of the data on the system call functions by the processor 120. In this case, types and orders of the invoked system call functions may vary depending on types of the operations performed by the terminal apparatus 100.

In addition, the processor 120 may generate data on operations performed by the terminal apparatus 100 in accordance with the manipulation of the terminal apparatus 100 by the user. Specifically, when the user manipulates the terminal apparatus 100, the terminal apparatus 100 operates according to the manipulation, and the processor 120 may generate data on an operation history of the terminal apparatus 100. For example, the data on the operations performed by the terminal apparatus 100 may include data on all types of operations that the terminal apparatus 100 may perform, such as power-on, power-off, application installation, execution, use, or end, page turning, web page access, photograph or video capturing, text input, and the like.

In addition, the processor 120 may encrypt the behavior data generated in the terminal apparatus 100 with different numbers of ciphertexts for each data type of the behavior data. In this case, the processor 120 may use the deterministic encryption scheme. Here, the deterministic encryption scheme refers to an encryption scheme of always encrypting the same data with the same ciphertexts even though the same data are separately encrypted.

Specifically, the processor 120 may determine the numbers of different ciphertexts with which the behavior data are to be encrypted, and encrypt the behavior data so that the same types of behavior data in units of the determined numbers are encrypted with different ciphertexts, thereby generating a ciphertext.

In this case, according to an embodiment of the disclosure, the processor 120 may generate the ciphertext by uniformly sampling the behavior data. Here, the uniform sampling means that the processor 120 divides and encrypts the behavior data so that frequencies of each type of ciphertexts to be accumulated in the server 200 have a uniform distribution. To this end, the processor 120 may use statistical data on occurrence frequencies for each data type of the behavior data.

As described above, the frequency attack is to reversely find out which behavior data has been encrypted with which ciphertext using a property that the occurrence frequencies for each type of the ciphertexts follow the statistical data on the occurrence frequencies for each type of the behavior data when many ciphertexts with which the behavior data are encrypted are accumulated. Therefore, the behavior data are encrypted, but when the behavior data are encrypted so that the frequencies for each type of the accumulated ciphertexts become different from the statistical data even though the ciphertexts are accumulated, the frequency attack becomes impossible.

Therefore, according to an embodiment of the disclosure, in a case where each of the types of the behavior data on the statistical data that may be used for the frequency attack is encrypted with at least one ciphertext, the processor 120 determines the numbers of ciphertexts making all of the occurrence frequencies for each types of the ciphertexts be the same as each other, for each data type of the behavior data, and encrypts the behavior data generated by the terminal apparatus 100 so that the same types of behavior data in units of the determined numbers are encrypted with different ciphertexts, thereby generating a ciphertext. Therefore, the processor 120 may make the frequency attack impossible even though the ciphertexts transmitted by the terminal apparatus 100 are accumulated in the server 200.

Figure 3:
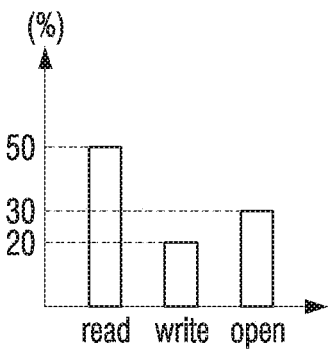
FIG. 3 is a view for describing a frequency attack and uniform sampling and deterministic encryption according to an embodiment of the disclosure.
Figure 3:
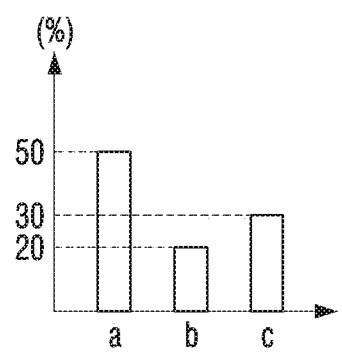
Figure 3:
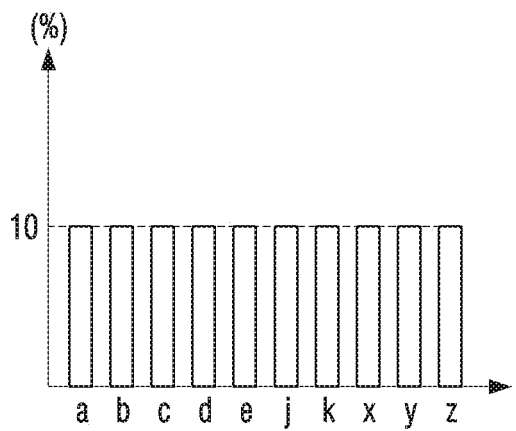

FIG. 3 is a view for describing a frequency attack and uniform sampling and deterministic encryption according to an embodiment of the disclosure. Meanwhile, a case where only read, write, and open among the system call functions are invoked according to the operation of the terminal apparatus 100 has been illustrated in FIG. 3, but this is only for convenience of explanation, and the types of the system calls are not limited thereto.

Part (a) of FIG. 3 illustrates statistical data on frequencies for each type of the system calls. Types and orders of the system calls invoked while the terminal apparatus 100 is operating according to the manipulation of the user may be different from each other for each manipulation of the user. However, when a large amount of data is accumulated and a statistical value is calculated, invoking frequencies of the system calls are converged in a relatively constant ratio. Part (a) of FIG. 3 illustrates statistical data in which read, write, and open are invoked in the ratio of 5:2:3 as an example.

Part (b) of FIG. 3 is a view for describing the frequency attack. When the terminal apparatus 100 encrypts the system calls simply in the deterministic encryption scheme, that is, for example, when the terminal apparatus 100 encrypts read, write, and open with a, b and c, respectively, the server 200 may generate a model by learning a pattern or an order of the ciphertexts received from the terminal apparatus 100, and may know that frequencies of the ciphertexts a, b, and c accumulated in the server 200 will have a ratio of 5:2:3, as illustrated in Part (b) of FIG. 3.

Therefore, the server 200 may calculate the frequencies for each type of the accumulated ciphertexts as illustrated in Part (b) of FIG. 3 and then compare the calculated frequencies with the statistical data of Part (a) of FIG. 3 to know that read, write, and open have been encrypted with a, b, and c, respectively. Because it is a known content which system call is invoked in which order according to the operation of the terminal apparatus 100, when the server 200 may know which system call has been encrypted with which ciphertext, the server 200 may know what the terminal apparatuses 100 is doing from the ciphertexts received from the terminal apparatus 100, such that a privacy problem of the user of the terminal apparatus 100 occurs.

Part (c) of FIG. 3 illustrates frequencies for each type of the ciphertexts accumulated in the server 200 in a case where the system calls are uniformly sampled and encrypted according to an embodiment of the disclosure. According to an embodiment of the disclosure, the processor 120 may determine the numbers of ciphertexts making the frequencies for each type of the ciphertexts to be accumulated in the server 200 have a uniform distribution, using the statistical data as illustrated in Part (a) of FIG. 3.

Specifically, in a case where read, write, and open on the statistical data as illustrated in Part (a) of FIG. 3 are encrypted, respectively, the processor 120 may determine the numbers of ciphertexts for each type of system calls making the frequencies for each type of the ciphertexts become constant. Because read, write, and open on the statistical data of Part (a) of FIG. 3 have a ratio of 5:2:3, in a case where read, write, and open are encrypted with five different ciphertexts, two different ciphertexts, and three different ciphertexts, respectively, it may be expected that the frequencies of each ciphertext will become constant.

Therefore, the processor 120 may determine that the numbers of different ciphertexts with which the system calls read, write, and open are to be encrypted are five, two, and three, and encrypt the system calls so that the same types of system calls in units of the determined numbers are encrypted with different ciphertexts, thereby generating a ciphertext. For example, in a case where the system calls are invoked in the order of read-read-write-open-read-open-write-open-read-read while the terminal apparatus 100 operates according to the manipulation of the user, the processor 120 may encrypt the system calls so that read in five units among the invoked system calls is encrypted with different ciphertexts a, b, c, d, and e, write in two units among the invoked system calls is encrypted with different ciphertexts j and k, and open in three units among the invoked system calls are encrypted with different ciphertexts x, y, and z, thereby generating a ciphertext a-b-j-x-c-y-k-z-d-e.

In a case where the processor 120 encrypts the system calls in the scheme as described above and transmits the ciphertext to the server 200, even though the server 200 calculates frequencies for each types of the accumulated ciphertexts, the frequencies for each types of the ciphertexts are the same as each other as illustrated in Part (c) of FIG. 3, and the frequency attack using the statistical data as illustrated in Part (a) of FIG. 3 is thus impossible.

Meanwhile, when the terminal apparatus 100 performs the same operation, invoked system calls are the same as each other, and the processor 120 sequentially encrypts the system calls uniformly sampled as described above using the deterministic encryption scheme. Therefore, the server 200 may generate a meaningful model by learning the ciphertext received from the terminal apparatus 100.

Meanwhile, the operation of the processor 120 has been described by taking the system call data as an example in FIG. 3, but an embodiment is not limited thereto. As described above, the server 200 may generate the model by learning the data on the operations (for example, power-on, power-off, web page access, application execution, page turning, image capturing, and the like) performed by the terminal apparatus 100 according to the manipulation of the user. Even in this example, when statistical data on the operations performed by the terminal apparatus 100 is known, the frequency attack is possible in spite of the encryption of the behavior data. Therefore, according to an embodiment of the disclosure, the processor 120 may uniformly sample the data on the operations performed by the terminal apparatus 100, generated by the terminal apparatus 100 on the basis of the statistical data on the operations performed by the terminal apparatus 100, and encrypt the uniformly sampled data in the deterministic encryption scheme to cause the server 200 to generate the model without a possibility of the frequency attack.

Meanwhile, an embodiment in which the processor 120 determines the numbers of different ciphertexts with which the behavior data are to be encrypted, for each type of the behavior data is not limited thereto. As described above, even though the ciphertexts are accumulated in the server 200, when the behavior data are encrypted so that the frequencies for each types of the accumulated ciphertexts are different from the statistical data, the frequency attack becomes impossible. Therefore, the processor 120 may determine that the numbers of ciphertexts making the frequencies for each type of the ciphertexts to be accumulated in the server 200 have a predetermined distribution different from the statistical data are the numbers of different ciphertexts with which the behavior data are to be encrypted.

The statistical data described above may be stored in the terminal apparatus 100 at the time of manufacturing the terminal apparatus 100. However, the statistical data is not limited thereto, and the processor 120 may receive or update the statistical data from a server providing the statistical data through the communicator 110. Alternatively, according to an embodiment, the processor 120 may calculate the statistical data for determining the numbers of ciphertexts using the behavior data accumulated in the terminal apparatus 100.

Meanwhile, the processor 120 may transmit the ciphertext generated by encrypting the behavior data as described above to the server 200 through the communicator 110.

The server 200 may generate the model by learning the ciphertext received from the terminal apparatus 100. For example, the server 200 may learn the system calls to generate the model regarding the pattern of the system calls invoked when the terminal apparatus 100 operates. In addition, the server 200 may generate the model regarding the operation pattern of the terminal apparatus 100 by learning the data on the operations performed by the terminal apparatus 100. A description of a content overlapping that of FIG. 1 among operations of the server 200 will be omitted.

The server 200 transmits the generated model to the terminal apparatus 100, and the terminal apparatus 100 may receive the model in which the behavior data has been learned, and accurately, the model in which the ciphertext has been learned from the server 200. Therefore, the processor 120 may perform various operations on the basis of the received model.

In particular, when the model on the behavior data learned in the server 200 on the basis of the transmitted ciphertext is received, the processor 120 may monitor the operation of the terminal apparatus 100 on the basis of the received model. Specifically, the processor 120 may monitor the operation of the terminal apparatus 100 by comparing the model received from the server 200 with currently generated behavior data.

For example, in a case where the model regarding the pattern of the system calls invoked when the terminal apparatus 100 is operated, the processor 120 may monitor an abnormal operation of the terminal apparatus 100 or an abnormal manipulation of the user by comparing system calls invoked according to a current operation of the terminal apparatus 100 with the received model.

The model regarding the pattern of the system calls received from the server 200 is generated by the server 200 learning data on system calls invoked in accordance with a normal manipulation of the terminal apparatus 100 by the user before the corresponding model is generated. Therefore, in an abnormal case, for example, in a case where another person uses the terminal apparatus 100 that is stolen or lost, system calls invoked in accordance with a manipulation of the terminal apparatus 100 by another person have a pattern different from that of the model, and the processor 120 may thus detect the abnormal operation of the terminal apparatus 100 or the abnormal manipulation of the user by comparing the model with the system calls.

Also in a case where the model regarding the operation pattern of the terminal apparatus 100 is received, the processor 120 may monitor the abnormal operation of the terminal apparatus 100 or the abnormal manipulation of the user by comparing data on an operation currently performed by the terminal apparatus 100 with the received model.

Meanwhile, because the model that the terminal apparatus 100 receives from the server 200 is the model in which the ciphertext is learned, the processor 120 needs to encrypt currently generated behavior data in the same manner as the method described above and then compare the encrypted behavior data with the model. Therefore, the processor 120 may generate the ciphertext by encrypting the behavior data generated by the terminal apparatus 100 after the reception of the model so that the same types of behavior data in units of the number of different ciphertexts determined as described above are encrypted with different ciphertexts, and compare the generated ciphertext with the model.

Meanwhile, hereinabove, a case where the server 200 generates the model by learning the behavior data (specifically, the ciphertext in which the behavior data are encrypted) and transmits the generated model to the terminal apparatus 100 has been described by way of example, but an embodiment is not limited thereto.

According to an embodiment, the server 200 may generate a machine learning parameter required for the terminal apparatus 100 to generate a model, by learning the behavior data (specifically, the ciphertext in which the behavior data are encrypted). In this case, when the parameter is received, the processor 120 may generate the model on the basis of the received parameter, and monitor the operation of the terminal apparatus 100 as described above on the basis of the generated model.

Figure 4:
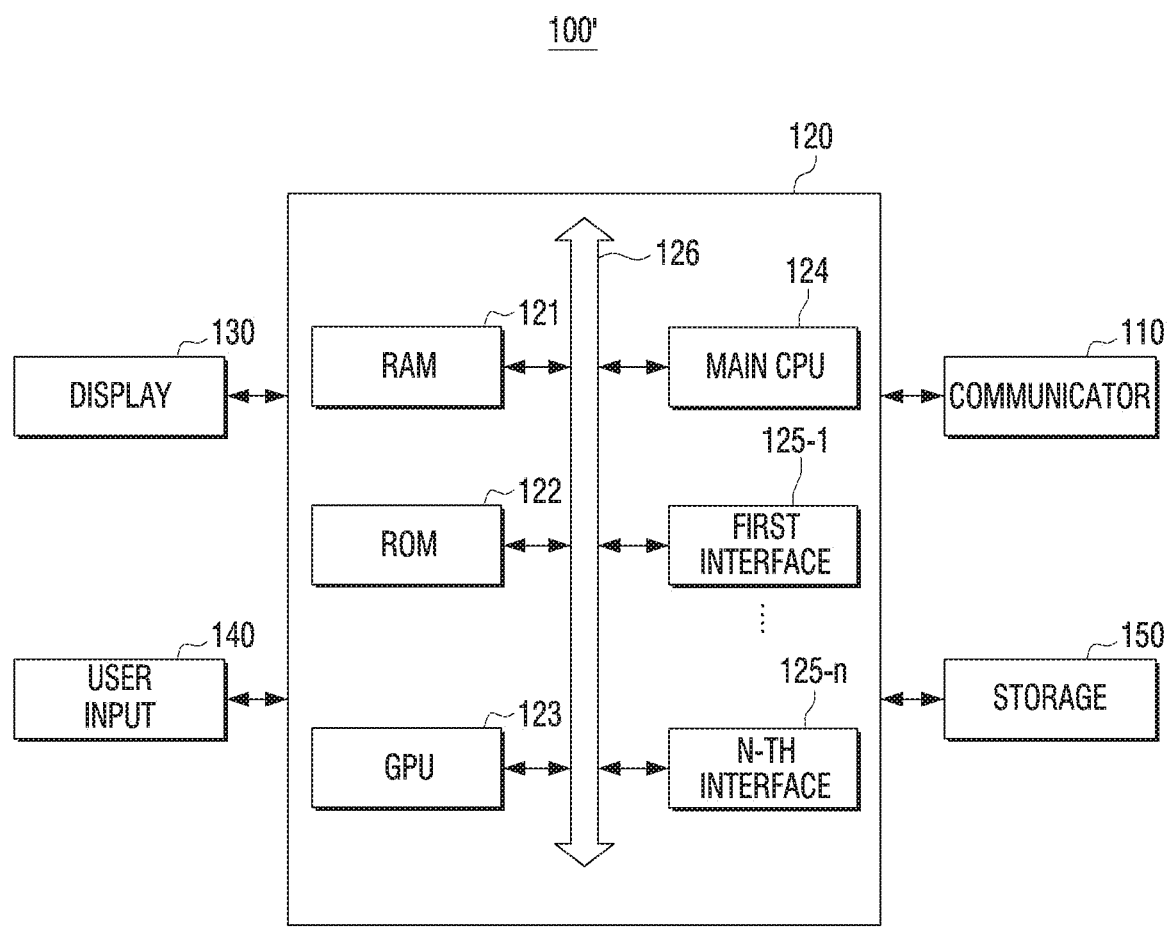
FIG. 4 is a detailed block diagram of a terminal apparatus according to another embodiment of the disclosure.

FIG. 4 is a detailed block diagram of the terminal apparatus according to another embodiment of the disclosure. As illustrated in FIG. 4, a terminal apparatus 100' includes a communicator 110, a processor 120, a display 130, a user input 140, and a storage 150. All of the respective components illustrated in FIG. 4 are not necessarily included in the terminal apparatus 100', and some of these components may be omitted or the other components may be added according to a type of the terminal apparatus 100'. In describing FIG. 4, a description of an overlapping content of the same components as those described above will be omitted.

The communicator 110 may perform communication with various external apparatuses to transmit and receive various information. In particular, the communicator 110 may transmit a ciphertext with which behavior data generated by the terminal apparatus 100' is encrypted to the server 200, and receive a model for the behavior data learned on the basis of the transmitted ciphertext from the server 200. In addition, the communicator 110 may receive statistical data on frequencies for each type of the behavior data from the server 200 or a separate server that manages the statistical data.

To this end, the communicator 110 may include at least one of a short-range wireless communication module (not illustrated) or a wireless local area network (LAN) communication module (not illustrated). Here, the short-range wireless communication module (not illustrated), which is a communication module wirelessly performing data communication with an external machine positioned in a short range, may be, for example, a Bluetooth module, a ZigBee module, a near field communication (NFC) module, an infrared communication module, or the like. In addition, the wireless LAN communication module (not illustrated) is a module connected to an external network according to a wireless communication protocol such as wireless fidelity (WiFi), institute of electrical and electronics engineers (IEEE), or the like, to perform communication with an external server or an external machine.

In addition, the communicator 110 may further include a mobile communication module accessing a mobile communication network according to various mobile communication protocols such as 3rd generation (3G), 3rd generation partnership project (3GPP), long term evolution (LTE), and the like, to perform communication, and may further include a wired communication module (not illustrated) according to communication protocols such as a high-definition multimedia interface (HDMI), a universal serial bus (USB), institute of electrical and electronics engineers (IEEE) 1394, RS-232, RS-422, RS-485, Ethernet, and the like.

The display 130 may display various images or screens according to the type of the terminal apparatus 100'. Here, the image may be an image of various formats such as a text, a still image, a video, an icon, a graphic user interface (GUI), an on-screen display (OSD), and the like. To this end, the display 130 may be implemented by various types of displays such as a liquid crystal display (LCD), an organic light emitting diode (OLED), an active-matrix OLED (AM-OLED), a plasma display panel (PDP), and the like.

The user input 140 may receive various user commands for manipulating the terminal apparatus 100'. To this end, the user input 140 includes a microphone that receives a user voice, a push-type button that receives a push manipulation of a user, a touch panel that receives a touch manipulation of the user, a jog switch that may be manipulated in a plurality of directions, an image sensor that receives an external image, a motion sensor that senses a movement of the user, and the like, but is not limited thereto. Meanwhile, the touch panel may include a touch screen forming a mutual layer structure with the display 130.

The storage 150 stores various programs and data. In particular, the storage 150 may store the statistical data on the frequencies for each type of the behavior data. In addition, the storage 150 may store an operating system (o/s) and various programs for performing an operation of the terminal apparatus 100'. To this end, the storage 150 may include a random access memory (RAM), a read only memory (ROM), a solid state disk (SSD), a flash memory, a hard disk, an optical disk, or the like, but is not limited thereto. According to an embodiment, the storage 150 may also be implemented by a cloud server, or the like.

A camera (not illustrated) captures an image outside the terminal apparatus 100' according to a user manipulation. To this end, the camera (not illustrated) may include various image sensors, lenses, and the like.

The processor 120 controls a general operation of the terminal apparatus 100'. In particular, the processor 120 may control the terminal apparatus 100' to perform the operation of the processor 120 described above through FIGS. 1 to 3.

To this end, the processor 120 may drive an operating system or an application program to control hardware or software components connected to the processor 120, and perform various kinds of data processing and computation. In addition, the processor 120 may load and process commands or data received from at least one of the other components into a volatile memory, and store various data in a non-volatile memory.

The processor 120 may be implemented by a dedicated processor (for example, an embedded processor) for performing corresponding operations or a generic-purpose processor (for example, a CPU or an application processor) capable of performing corresponding operations by executing one or more software programs stored in a memory device.

The processor 120 may include a RAM 121, a ROM 122, a graphic processing unit (GPU) 123, a main CPU 124, and first to n-th interfaces 125-1 to 125-n. The RAM 121, the ROM 122, the GPU 123, the main CPU 124, the first to n-th interfaces 125-1 to 125-n, and the like, may be connected to each other through a bus 126. The main CPU 124 accesses the storage 150 to perform booting using the operating system (O/S) stored in the storage 150. In addition, the main CPU 124 may perform various operations using various programs, contents, data, and the like, stored in the storage 150.

Specifically, an instruction set for booting a system, or the like, is stored in the ROM 122. When a turn-on command is input to supply power to the main CPU 124, the main CPU 124 copies the operating system (O/S) stored in the storage 150 to the RAM 121 depending on an instruction stored in the ROM 122, and execute the O/S to boot the system. When the booting is completed, the main CPU 124 copies various programs stored in the storage 150 to the RAM 121, and executes the programs copied to the RAM 121 to perform various operations. The GPU 123 may generate a screen including various objects such as an icon, an image, a text, and the like, when the booting of the terminal apparatus 100' is completed.

Figure 5:
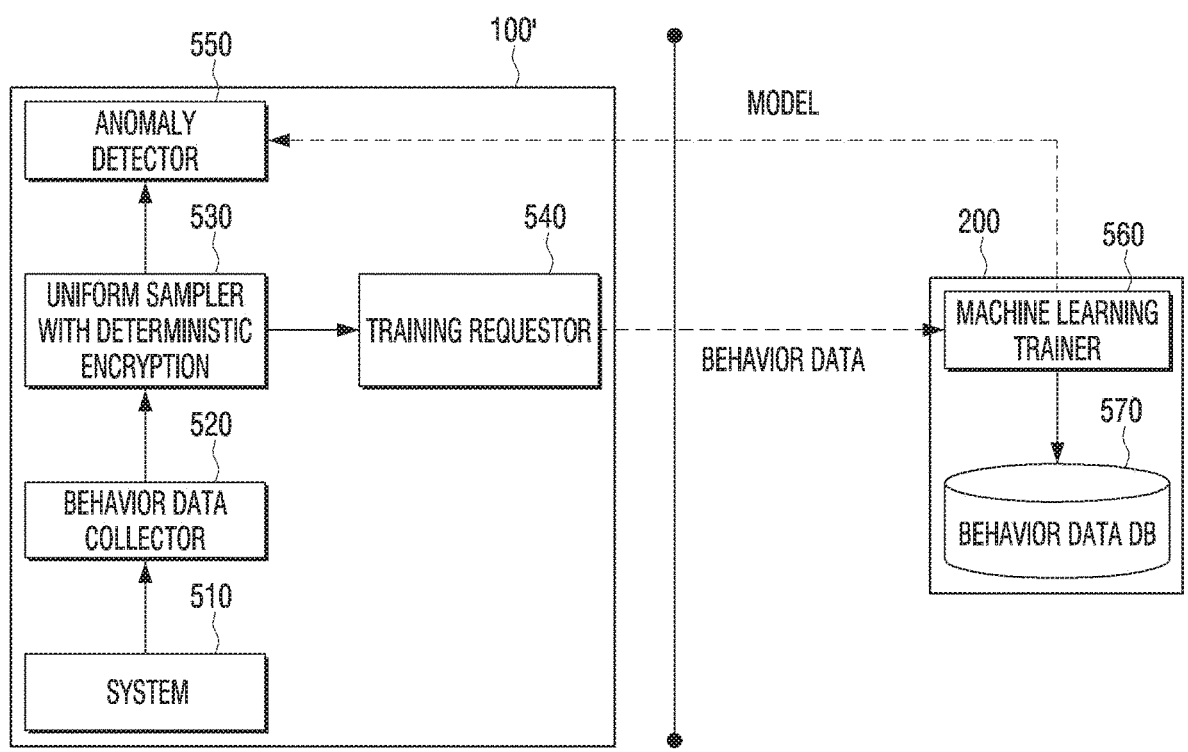
FIG. 5 is a view for describing operations of the machine learning system according to an embodiment of the disclosure in module units.

FIG. 5 is a view for describing operations of the machine learning system according to an embodiment of the disclosure in module units. As illustrated in FIG. 5, the terminal apparatus 100' may include a system 510, a behavior data collector 520, a uniform sampler 530 with deterministic encryption, a training requestor 540, and an anomaly detector 550, and the server 200 may include a machine learning trainer 560 and behavior data database (DB) 570.

The system 510 is a component generating behavior data according to operations of the terminal apparatus 100'. For example, the system 510 may be an operating system, middleware, or various applications, but is not limited thereto. For example, the system 510 may provide system call functions invoked in accordance with a manipulation of the terminal apparatus 100' by the user or generate data on operations performed by the terminal apparatus 100'.

The behavior data collector 520 collects the behavior data whenever the behavior data is generated by the system 510 or at a predetermined period.

The uniform sampler 530 with deterministic encryption uniformly samples and deterministically encrypts the behavior data collected by the behavior data collector 520, as described above, to generate a ciphertext. In this case, the deterministic encryption scheme may be an advanced encryption standard (AES) or a data encryption standard (DES), but is not limited thereto.

The training requester 540 may transmit the ciphertext generated by the uniform sampler 530 with deterministic encryption to the server 200 whenever the ciphertext is generated or at a predetermined period.

Machine learning is performed through the machine learning trainer 560 of the server 200 on the behavior data (specifically, the ciphertext in which the behavior data are encrypted) transmitted from the terminal apparatus 100 or 100', and a predetermined amount or a predetermined time of behavior data are stored and maintained in the behavior data DB 570 for learning of the machine learning trainer 560.

Meanwhile, when a model is generated by the machine learning trainer 560, the generated model is provided to the terminal apparatus 100', and the anomaly detector 550 of the terminal apparatus 100' performs anomaly detection on the behavior data on the basis of the model. In this case, according to an embodiment of the disclosure, the machine learning trainer 560 of the server 200 may machine-learn the behavior data to provide a parameter to the terminal apparatus 100' and the anomaly detector 550 of the terminal apparatus 100' may generate an model using the parameter received from the server 200 and then perform the anomaly detection, but is not limited thereto.

Specifically, the anomaly detector 550 may perform the anomaly detection by comparing a ciphertext generated by encrypting the behavior data collected by the behavior data collector 520 after the reception of the model (or the parameter) by the uniform sampler 530 with deterministic encryption with the model received from the server 200 (or the model generated using the parameter).

Meanwhile, the respective modules of the terminal apparatus 100' illustrated in FIG. 5 may be program modules stored in the storage 150. Therefore, the processor 120 may execute the operations described above by executing the program modules stored in the storage 150.

FIG. 6 is a flow chart illustrating operations of the terminal apparatus 100 or 100' according to an embodiment of the disclosure. As illustrated in FIG. 6, the terminal apparatus 100 or 100' may determine the numbers of different ciphertexts with which behavior data are to be encrypted for each data type of behavior data generated in accordance with a manipulation of the terminal apparatus by the user (S610). In this case, the behavior data may be invoking data of system call functions provided by an operating system of the terminal apparatus 100 or 100' or data on operations performed by the terminal apparatus 100 or 100', but are not limited thereto.

Specifically, the terminal apparatus 100 or 100' may obtain statistical data on occurrence frequencies for each data type of the behavior data, and determine that the numbers of ciphertexts for each data type making occurrence frequencies of each ciphertext predetermined frequencies are the numbers of different ciphertexts in a case where each of the types of the behavior data on the obtained statistical data is encrypted with at least one ciphertext. Here, the predetermined frequencies may be frequencies different from the occurrence frequencies for each data type of the behavior data on the statistical data. In particular, all of the occurrence frequencies for each data type of the behavior data may be the same as each other, but are not limited thereto.

Meanwhile, the terminal apparatus 100 or 100 may generate a ciphertext by encrypting the behavior data so that the same types of behavior data in units of the determined numbers are encrypted with different ciphertexts (S620), and transmit the generated ciphertext to the external server 200 (S630). In this case, the terminal apparatus 100 or 100' may sequentially encrypt the behavior data generated using a deterministic encryption scheme such as an AES or a DES.

The server 200 may machine-learn the behavior data (specifically, the ciphertext) received from the terminal apparatus 100 or 100' to generate a model for the behavior data. Specifically, in a case where the behavior data received from the terminal apparatus 100 or 100' are data on system calls (specifically, a ciphertext in which the data on the system calls are encrypted), the server 200 may generate a model regarding a pattern of the system calls invoked when the terminal apparatus 100 or 100' operates. In addition, in a case where the behavior data received from the terminal apparatus 100 or 100' are the data on the operations performed by the terminal apparatus 100 or 100' (specifically, the ciphertext in which the data on the operations performed by the terminal apparatus 100 or 100' are encrypted), the server 200 may generate a model regarding an operation pattern of the terminal apparatus 100 or 100'.

In this case, the generation of the model by the server 200 may include not only direct generation of a model for corresponding behavior data (specifically, a ciphertext) by the server 200, but also generation of a parameter for generating the model. Meanwhile, the model (or the parameter) provided by the server 200 may be updated in the terminal apparatus 100 or 100' at a predetermined period.

Therefore, when the terminal apparatus 100 or 100' receives the model (or the parameter) for the behavior data learned on the basis of the transmitted ciphertext, an operation of the terminal apparatus 100 may be monitored on the basis of the received model (or parameter) (S640).

Specifically, the terminal apparatus 100 or 100' may generate a ciphertext by encrypting behavior data generated by the terminal apparatus 100 or 100' after the reception of the model (or the parameter) so that the same types of behavior data in units of the numbers determined in S610 are encrypted with different ciphertexts, and monitor the operation of the terminal apparatus 100 or 100' by comparing the ciphertext generated after the reception of the model (or the parameter) with the model received from the server 200 (or the model generated by the terminal apparatus 100 or 100' using the parameter).

Meanwhile, hereinabove, the data on the system calls and the data on the operations performed by the terminal apparatus 100 or 100' have been mainly described as an example of the behavior data, but the behavior data are not limited thereto. That is, statistical data on frequencies for each type of the behavior data exist as the data generated by the terminal apparatus 100 or 100' according to the manipulation of the user, such that a frequency attack is possible, and any data on which machine learning may be performed in the server 200 may be the behavior data. For example, data on a lock screen unlocking operation of the terminal apparatus 100 or 100' by the user, data on a web surfing history of the user, data on an online shopping history of the user, data on a text input by the user, or the like, may be the behavior data. Such behavior data is encrypted through the uniform sampling and the deterministic encryption as described above, and a ciphertext is transmitted to the server 200.

The server 200 may generate a model by learning the behavior data (accurately, the ciphertext). For example, in a case where the behavior data is the data on the lock screen unlocking operation, the server 200 may generate a model regarding a lock screen unlocking operation pattern of the user. In addition, in a case where the behavior data is data on an application use history of the user, the server 200 may generate a model regarding an application use pattern of the user. Further, in a case where the behavior data is the data on the online shopping history of the user, the server 200 may generate a model regarding an online shopping pattern of the user. Further, in a case where the behavior data is the data on the text input by the user, the server 200 may generate a model regarding a word use pattern of the user.

As such, the models generated by the server 200 may be provided to the terminal apparatus 100 and 100', and the terminal apparatus 100 or 100' may perform various operations using the received models. Meanwhile, hereinabove, a case in which the operation of the terminal apparatus 100 or 100' is monitored using the model received by the terminal apparatus 100 or 100' has been mainly described by way of example, but the disclosure is not limited thereto. For example, in a case where the model regarding the online shopping pattern or the model regarding the application use pattern is received, the terminal apparatus 100 or 100' may provide a product recommendation service or an application recommendation service. In addition, in a case where the model regarding the word use pattern of the user is received, the terminal apparatus 100 or 100' may provide a related search word or similar word recommendation service. A more detailed content about which operation the terminal apparatus 100 or 100' may perform according to the model received from the server 200 is unrelated to the gist of the disclosure, and a detailed description thereof will thus be omitted.

Meanwhile, hereinabove, a case where the server 200 generates the model through the machine learning has been described by way of example, the technical spirit of the disclosure is not limited thereto. For example, the technical spirit of the disclosure may also be applied to a system in which the server 200 learns the behavior data (specifically, the ciphertext) using a neural network or a deep learning algorithm and provides the learned model to the terminal apparatus 100 or 100'.

As described above, according to the diverse embodiments of the disclosure, it is possible to learn the behavior data of the user of the terminal apparatus in the server and utilize the learned model in the terminal apparatus, without causing the privacy problem.

Meanwhile, the diverse embodiments of the disclosure may be implemented by software including instructions stored in a machine-readable storage medium (for example, a computer-readable storage medium). Here, a machine may be an apparatus that invokes the stored instruction from the storage medium and may be operated according to the invoked instruction, and may include the server 200 or the terminal apparatus 100 or 100' according to the disclosed embodiments. In a case where a command is executed by the processor, the processor may directly perform a function corresponding to the command or other components may perform the function corresponding to the command under a control of the processor. The command may include codes created or executed by a compiler or an interpreter. The machine-readable storage medium may be provided in a form of a non-transitory storage medium. Here, the term 'non-transitory' means that the storage medium is tangible without including a signal, and does not distinguish whether data are semi-permanently or temporarily stored in the storage medium.

According to an embodiment, the methods according to the diverse embodiments disclosed in the disclosure may be included and provided in a computer program product. The computer program product may be traded as a product between a seller and a purchaser. The computer program product may be distributed in a form of a storage medium (for example, a compact disc read only memory (CD-ROM)) that may be read by the machine or online through an application store (for example, PlayStore™). In a case of the online distribution, at least portions of the computer program product may be at least temporarily stored in a storage medium such as a memory of a server of a manufacturer, a server of an application store, or a relay server or be temporarily created.

Each of components (for example, modules or programs) according to the diverse embodiments may include a single entity or a plurality of entities, and some of the corresponding sub-components described above may be omitted or other sub-components may be further included in the diverse embodiments. Alternatively or additionally, some of the components (for example, the modules or the programs) may be integrated into one entity, and may perform functions performed by the respective corresponding components before being integrated in the same or similar manner Operations performed by the modules, the programs, or other components according to the diverse embodiments may be executed in a sequential manner, a parallel manner, an iterative manner, or a heuristic manner, at least some of the operations may be performed in a different order or be omitted, or other operations may be added.

The technical spirit of the disclosure is illustratively described hereinabove. It will be appreciated by those skilled in the art that various modifications and alterations may be made without departing from the essential characteristics of the disclosure. In addition, the embodiments of the disclosure are not to limit the technical spirit of the disclosure, but are to describe the technical spirit of the disclosure, and the technical scope of the disclosure is not limited by these embodiments. Therefore, the scope of the disclosure should be interpreted by the following claims, and it is to be interpreted that all the spirits equivalent to the following claims fall within the scope of the disclosure.

The invention claimed is:

1. A control method of a terminal apparatus, the method comprising:
    obtaining statistical data on occurrence frequencies for each data type of a behavior data;
    determining that numbers of different ciphertexts for each data type to make occurrence frequencies of each ciphertext correspond to predetermined frequencies are the numbers of different ciphertexts in a case where each of the types of behavior data in the obtained statistical data is encrypted with at least one ciphertext;
    generating a plurality of the behavior data in accordance with a manipulation of the terminal apparatus by a user and identifying respectively data type of the plurality of the behavior data;
    generating a ciphertext by encrypting respectively the behavior data in the same types with the different ciphertexts corresponding to the data type in units of the determined numbers;
    transmitting the generated ciphertext to an external server; and
    monitoring an operation of the terminal apparatus on a basis of a model on the behavior data learned on the basis of the transmitted ciphertext when the model is received.

2. The control method as claimed in claim 1, wherein the predetermined frequencies are different from the occurrence frequencies for each data type of the behavior data on the statistical data.

3. The control method as claimed in claim 1, wherein the monitoring includes:
    generating a ciphertext by encrypting behavior data generated after a reception of the model so that the same types of behavior data in units of the determined numbers are encrypted with the different ciphertexts, and
    monitoring the operation of the terminal apparatus by comparing the ciphertext generated after the reception of the model with the model.

4. The control method as claimed in claim 1, wherein in the generating, the behavior data are sequentially encrypted using a deterministic encryption scheme.

5. The control method as claimed in claim 1, wherein the behavior data are learning data that the external server uses for machine learning to generate the model.

6. The control method as claimed in claim 1,
    wherein the behavior data are invoking data of system call functions provided by an operating system of the terminal apparatus or data on operations performed by the terminal apparatus, and
    wherein the model is a model regarding a pattern of system calls invoked when the terminal apparatus operates or a model regarding an operation pattern of the terminal apparatus.

7. The control method as claimed in claim 1, further comprising updating the model at a predetermined period.

8. A terminal apparatus comprising:
    a communicator configured to communicate with an external server; and
    a processor configured to:
        obtain statistical data on occurrence frequencies for each data type of a behavior data,
        determine that numbers of different ciphertexts for each data type to make occurrence frequencies of each ciphertext correspond to predetermined frequencies are the numbers of different ciphertexts in a case where each of the types of behavior data in the obtained statistical data is encrypted with at least one ciphertext,
        generate a plurality of the behavior data in accordance with a manipulation of the terminal apparatus by a user and identify respectively data type of the plurality of the behavior data,
        generate a ciphertext by encrypting respectively the behavior data in the same types with different ciphertexts corresponding to the data type in units of the determined numbers,
        transmit the generated ciphertext to the external server, and
        monitor an operation of the terminal apparatus on a basis of a model on the behavior data learned on the basis of the transmitted ciphertext when the model is received.

9. The terminal apparatus as claimed in claim 8, wherein the predetermined frequencies are different from the occurrence frequencies for each data type of the behavior data on the statistical data.

10. The terminal apparatus as claimed in claim 8, wherein the processor is configured to:
    generate a ciphertext by encrypting behavior data generated after a reception of the model so that the same types of behavior data in units of the determined numbers are encrypted with the different ciphertexts, and
    monitor the operation of the terminal apparatus by comparing the ciphertext generated after the reception of the model with the model.

11. The terminal apparatus as claimed in claim 8, wherein the processor is configured to sequentially encrypt the behavior data using a deterministic encryption scheme.

12. The terminal apparatus as claimed in claim 8, wherein the behavior data are learning data that the external server uses for machine learning to generate the model.

13. The terminal apparatus as claimed in claim 8,
    wherein the behavior data are invoking data of system call functions provided by an operating system of the terminal apparatus or data on operations performed by the terminal apparatus, and
    wherein the model is a model regarding a pattern of system calls invoked when the terminal apparatus operates or a model regarding an operation pattern of the terminal apparatus.

* * * * *